(12) United States Patent
Rüther et al.

(10) Patent No.: US 9,121,640 B2
(45) Date of Patent: Sep. 1, 2015

(54) SYSTEM FOR THERMALLY PROCESSING LUMPY SOLID MATERIAL

(75) Inventors: Thomas Rüther, Drensteinfurt (DE); Tobias Klegraf, Rüthen (DE); Alexander Peters, Beckum (DE)

(73) Assignee: ThyssenKrupp Industrial Solutions AG (DE)

( * ) Notice: Subject to any disclaimer, the term of this patent is extended or adjusted under 35 U.S.C. 154(b) by 885 days.

(21) Appl. No.: 13/201,314

(22) PCT Filed: Mar. 18, 2010

(86) PCT No.: PCT/EP2010/053562
§ 371 (c)(1),
(2), (4) Date: Aug. 12, 2011

(87) PCT Pub. No.: WO2010/121870
PCT Pub. Date: Oct. 28, 2010

(65) Prior Publication Data
US 2011/0294084 A1 Dec. 1, 2011

(30) Foreign Application Priority Data

Apr. 20, 2009 (DE) .......................... 10 2009 018 099

(51) Int. Cl.
*F27B 9/30* (2006.01)
*F27D 3/00* (2006.01)
*C04B 2/10* (2006.01)
*C04B 7/43* (2006.01)
*F27B 7/20* (2006.01)
*F27B 7/32* (2006.01)
*F27D 13/00* (2006.01)

(52) U.S. Cl.
CPC .............. *F27D 3/0033* (2013.01); *C04B 2/10* (2013.01); *C04B 7/432* (2013.01); *F27B 7/2016* (2013.01); *F27B 7/3205* (2013.01); *F27D 13/00* (2013.01)

(58) Field of Classification Search
CPC ........ C03B 5/12; C04B 20/06; C04B 20/061; C04B 20/066; C04B 2/10; C04B 7/432; F27B 9/30
USPC .......................... 432/13, 16, 67, 69, 218, 239
See application file for complete search history.

(56) References Cited

U.S. PATENT DOCUMENTS 3,356,213 A * 12/1967 Weber ........................... 209/638
3,409,450 A * 11/1968 Weber et al. .................... 501/85

(Continued)

*Primary Examiner* — Alissa Tompkins
*Assistant Examiner* — Benjamin W Johnson
(74) *Attorney, Agent, or Firm* — Renner Kenner Greive Bobak Taylor & Weber

(57) ABSTRACT

The system according to the invention for thermally processing lumpy solid material substantially comprises a preheating device, a furnace and a separation or classification device which is arranged therebetween and which has a coarse material outlet connected to the furnace and a fine material outlet. The furnace and the preheating device are connected to each other by means of a gas/solid material line which is arranged so as to be inclined relative to the vertical, the furnace exhaust gases being introduced at the end of the gas/solid material line at the furnace side and the preheated solid material being supplied at the end at the preheater side. The separation or classification device is connected to a bypass line which branches off from the gas/solid material line so that at least a partial amount of the preheated solid material can be branched off via the bypass line by means of gravitational force and can be supplied to the separation or classification device.

20 Claims, 2 Drawing Sheets

(56) References Cited

U.S. PATENT DOCUMENTS

Figure 1:
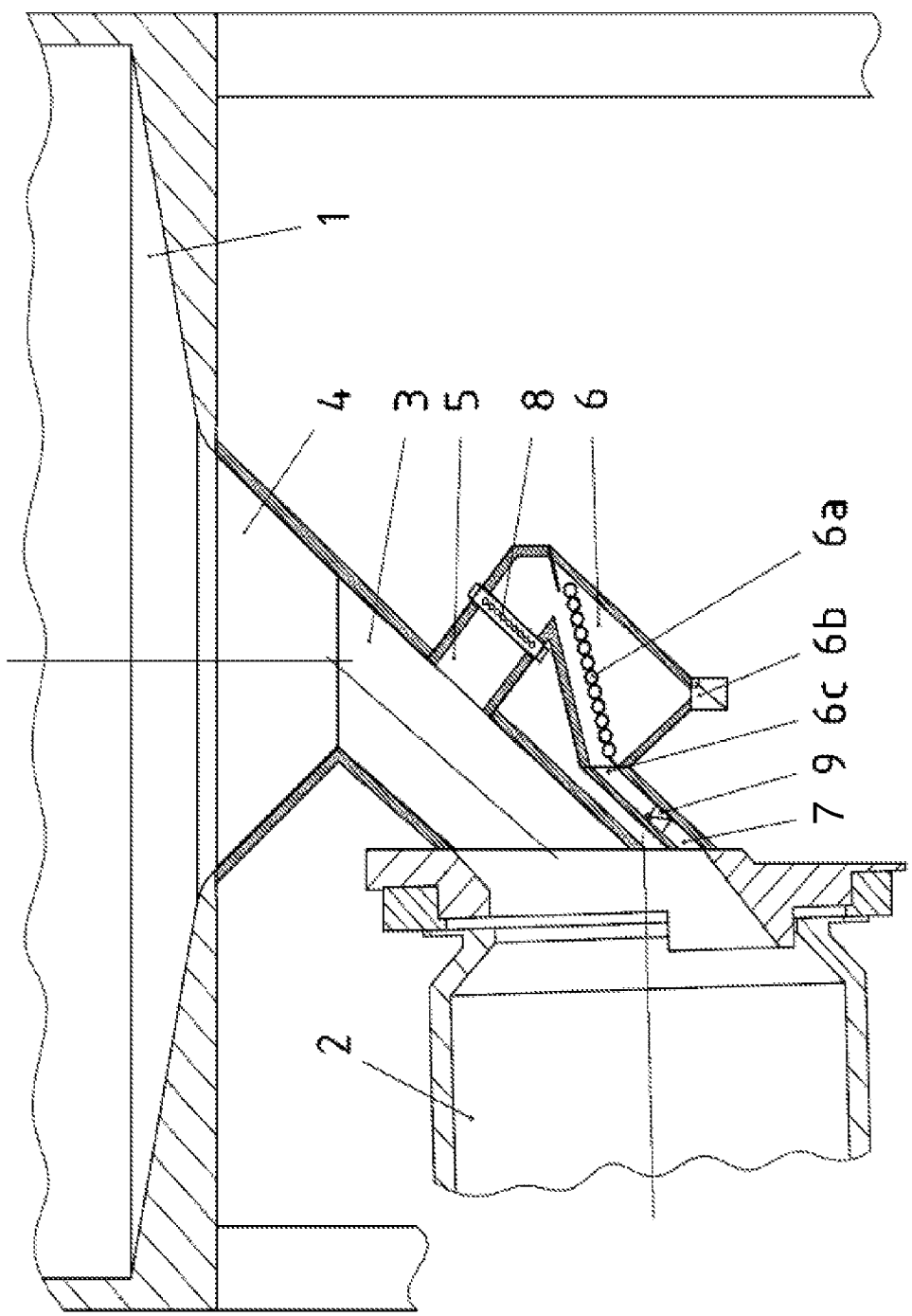

| | | | |
|---|---|---|---|
| 3,954,604 A * | 5/1976 | Krause et al. | 209/325 |
| 4,265,613 A * | 5/1981 | Oppenberg | 431/121 |
| 4,291,808 A * | 9/1981 | Roloff | 209/668 |
| 4,529,429 A * | 7/1985 | Wood | 65/29.1 |
| 4,555,895 A * | 12/1985 | Torre | 53/557 |
| 4,708,644 A * | 11/1987 | Lawall et al. | 432/106 |
| 5,536,167 A * | 7/1996 | Yokota et al. | 432/58 |
| 6,595,772 B1 * | 7/2003 | Ramesohl | 432/14 |

\* cited by examiner

SYSTEM FOR THERMALLY PROCESSING LUMPY SOLID MATERIAL

The invention relates to a system for thermally processing lumpy solid material having a preheating device, a furnace and a separation or classification device which is arranged therebetween and which has a coarse material outlet connected to the furnace and a fine material outlet.

Such systems are used, for example, for thermally processing limestone. In modern rotary furnace systems, for example, for producing lime for steelworks, a preheating device in the form of a shaft preheater is generally arranged upstream of the furnace, as also shown, for example, in DD 245 243 A1. In that publication, the shaft preheater comprises a plurality of mutually separate preheater shafts which are connected to the furnace via a common transport member which is in the form of a thrust plate conveyor. If sulphur-containing fuel is intended to be used in such a system for cost reasons, the maximum admissible sulphur content in the fuel is limited by the maximum admissible limit value for sulphur in lime.

In accordance with combustion conditions, the structural configuration of the system and stone characteristics, it is possible to use fuels containing sulphur to different extents. Circuits are formed between the preheater and the furnace. These are dust and salt circuits, for example, sulphur circuits. The components forming circuits are partially vaporised in the furnace at a specific temperature and condense in the preheater. Since condensation is a reaction which is dependent on the particle surface, small particles specifically take up a greater amount of salt than large particles do. If the concentrations of specific components such as, for example, sulphur, are too great in the circuit, accumulations which impair operation of the system may occur between the furnace and the preheater.

Therefore, using highly sulphurous fuels in conventional preheater systems is limited owing to the undesirable influence on the product quality and the risk of operational disruption.

It is already known in practice to provide a sulphur bypass, by which fine material can be discharged from the preheating process, between the furnace and the lime shaft preheater. The circuit is relieved and the product sulphur is reduced. The material is mechanically classified because sifting processes are uneconomical in this regard. In order to be able to supply it to the sifting machine, however, it is necessary for the material and the preheating air to be separated. In DE 100 60381 A1, this is brought about by a separate material and gas line between the preheater and the cylindrical rotary furnace. However, this construction results in great height between the preheater and the furnace. High costs thereby result again in the structural member. Since that concept results in a specific minimum construction height, it is not possible to provide existing preheaters with sulphur bypass systems.

Therefore, an object of the invention is to reduce the construction costs for a system for thermally processing lumpy solid material. Another object is to further develop the system for thermally processing lumpy solid material so that a preheating device which already exists can also be provided with a sulphur bypass system.

Those objects are achieved according to the invention by the features of claim 1.

The system according to the invention for thermally processing lumpy solid material substantially comprises a preheating device, a furnace and a separation or classification device which is arranged therebetween and which has a coarse material outlet connected to the furnace and a fine material outlet. The furnace and the preheating device are connected to each other by means of a gas/solid material line which is arranged so as to be inclined relative to the vertical, the furnace exhaust gases being introduced at the end of the gas/solid material line at the furnace side and the preheated solid material being supplied at the end at the preheater side. The separation or classification device is connected to a bypass line which branches off from the gas/solid material line so that at least a partial amount of the preheated solid material can be branched off via the bypass line by means of gravitational force and can be supplied to the separation or classification device.

The structural height is substantially reduced in comparison with known systems having a sulphur bypass owing to the gas/solid material line arranged in an inclined manner and the separation or classification device connected thereto. It is further also possible to integrate the sulphur bypass into systems which already exist.

The dependent claims relate to other constructions of the invention.

According to a preferred construction of the invention, the separation or classification device is constructed in such a manner that the solid material is conveyed by means of gravitational force. The inclination of the gas/solid material line relative to the vertical preferably takes up an angle in the range from 25 to 65°.

The separation or classification device may be formed, for example, by a driven sieving machine, but particularly also by a roller table screen. The roller table screen is preferably arranged in an inclined manner and can further also be cooled.

The separation or classification device is preferably arranged below the gas/solid material line so that the solid material can also be transported to the separation or classification device by means of gravitational force. Owing to that arrangement of the separation or classification device, the device is not directly exposed to the hot gases being discharged from the furnace or the furnace radiation.

A closure member, in particular a needle gate, can further be provided in the bypass line. It is thereby possible to close the separation or classification device for the purposes of maintenance or repair. The preheated solid material then slides directly into the furnace via the gas/solid material line arranged in an inclined manner.

According to a particular construction of the invention, the preheating device has a central discharge funnel, on which the inclined gas/solid material line can be arranged in such a manner that the preheated solid material either falls directly into the bypass line or slides in via the gas/solid material line. In that manner, up to 100% of the lumpy solid material can be supplied to the separation or classification device via the bypass line. When the above-described system is operated, the lumpy solid material is preheated in the preheating device with the hot exhaust gases of the furnace and burnt in the furnace, with at least a partial amount of the preheated solid material which is then separated/classified into coarse material and fine material in the separation or classification device being branched off via the bypass line, the coarse material being supplied to the furnace and the fine material being discharged. The discharged fine material which has an increased sulphur content in comparison with the remainder of the particle size range is then supplied for suitable further processing or disposal.

Figure 2:
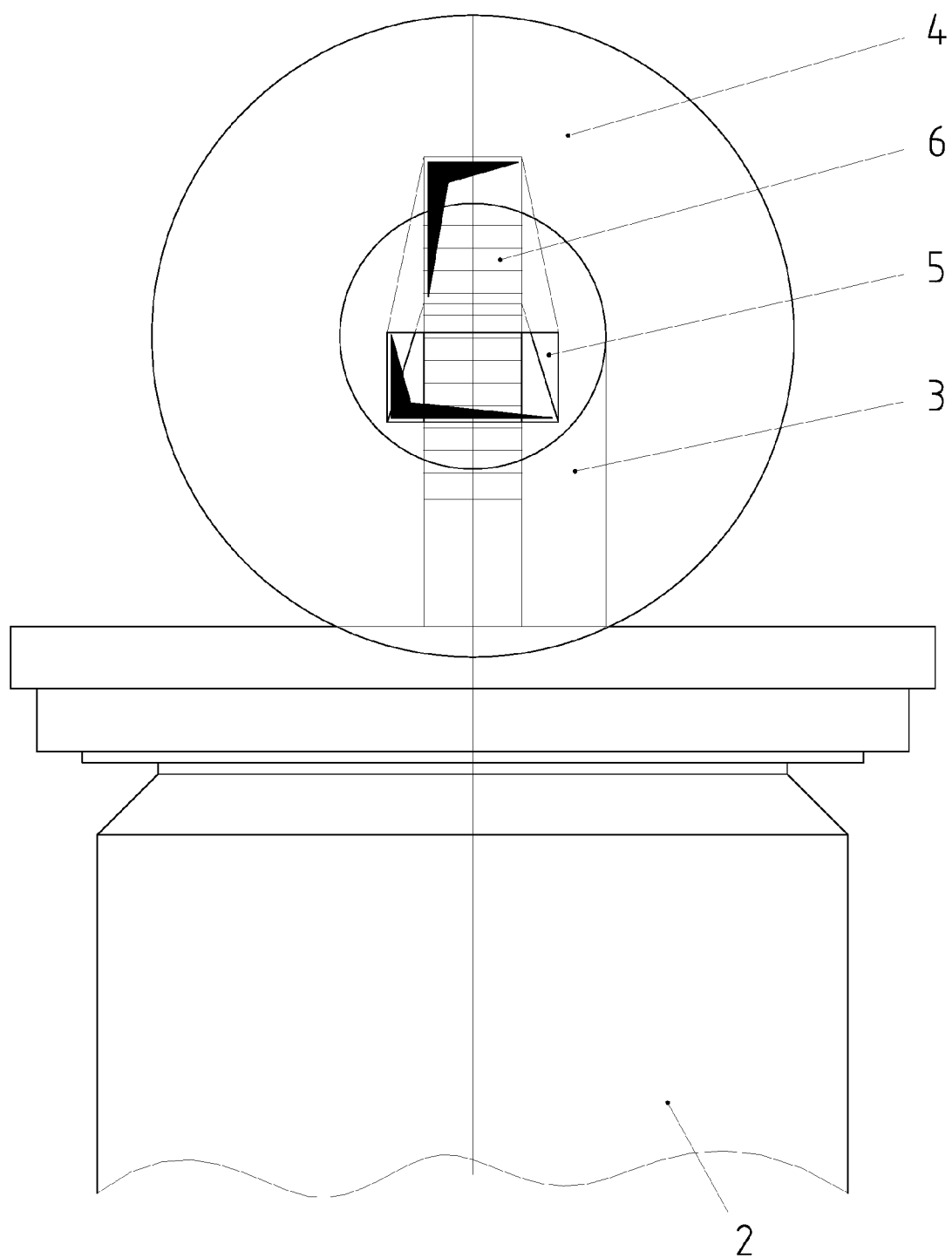

Other advantages and constructions of the invention will be explained in greater detail below with reference to the description and the drawings, in which:

FIG. 1 is a schematic sectional illustration of the system in the region between the preheater and the furnace, FIG. 2 is a schematic top view into the discharge funnel of the preheating device.

The system illustrated in FIG. 1 for thermally processing lumpy solid material substantially comprises a preheating device 1 and a furnace 2 in the form of a cylindrical rotary furnace, which are connected to each other via a gas/solid material line 3 arranged so as to be inclined relative to the vertical.

The preheating device is in the form of a shaft type preheater, the solid material to be processed being supplied in the upper region of the preheating device 1 and being removed in the lower region via a central discharge funnel 4.

The obliquely arranged gas/solid material line 3 is connected at the preheater-side end to the discharge funnel 4 and opens at the furnace-side end in the furnace 2. The exhaust gases of the furnace 2 are consequently introduced into the gas/solid material line 3 and subsequently flow through the preheating device 1 in counter-current relative to the lumpy solid material.

At the lower side of the gas/solid material line 3, a bypass line 5 which is connected to a separation or classification device 6 further branches off. The top view through the discharge funnel 4 according to FIG. 2 shows that the discharge funnel 4 and the bypass line 5 are connected to the gas/solid material line in such a manner that the preheated solid material either falls directly into the bypass line 5 or slides therein via the gas/solid material line 3. The total preheated solid material can thereby be branched off via the bypass line 5 to the separation or classification device 6.

In the embodiment illustrated, the separation device 6 has a roller table screen 6a arranged in an inclined manner, a fine material outlet 6b and a coarse material outlet 6c. The coarse material outlet 6c is connected to the furnace 2 via a connection line 7 in the form of a gravity line. The roller table screen 6a can be optionally constructed so as to be driven and/or cooled.

The preheated solid material discharged from the discharge funnel 4 either falls directly into the bypass line 5 or slides via the gas/solid material line 3 into the bypass line 5 and, at that location, reaches the roller table screen 6a by means of gravitational force. The fine material portion of the solid material falls through the roller table screen 6a and is conveyed away by means of the fine material outlet 6b. This is fine material which has an increased sulphur content in comparison with the remainder of the particle size range and which is further processed in a suitable manner and/or disposed of. The coarse material portion reaches the furnace 2, in which the material is finished being burnt, via the coarse material outlet 6c and the connection line 7 by means of gravitational force.

A closure member 8 in the form of a needle gate is further arranged in the bypass line 5. The separation or classification device 6 can thereby be closed, for example, in the event of repair or maintenance. The portion of the bypass line 5 between the gas/solid material line 3 and the closure member 8 will then become filled with solid material so that the other solid material is subsequently directed via the gas/solid material line 3 directly into the furnace 2.

In order to reduce the furnace exhaust gases in the separation or classification device 6, an air closure member 9 in the form of a simple shuttle valve is arranged in the connection line 7. The loaded simple shuttle valve seals the gas flow owing to the coarse material which flows downwards. The thermal load of the separation or classification device is thereby lowered and the coarse material can reach the furnace 2 owing to gravitational force.

The inclination of the gas/solid material line 3 and the connection of the bypass line 5 at the lower side thereof allow transport of the preheated solid material by means of gravitational force. Owing to the inclined arrangement of the gas/solid material line, the total structural height of the system can be reduced accordingly. Therefore, it is desirable to fix the angle of inclination so that it is still possible to transport the solid material by gravitational force. The advantageous inclination of the gas/solid material line relative to the vertical is in an angular range from 25 to 65°. The angle of repose of the solid material to be processed has been found to be the optimum angle.

The connection of the bypass line 5 at the lower side of the gas/solid material line 3 also has the advantage, in addition to the solid material being transported by gravitational force, that the furnace exhaust gases flowing out of the furnace 2 are substantially separated from the solid material.

The invention claimed is:

1. A system for thermally processing lumpy solid material comprising: a preheating device, a furnace and a separation or classification device arranged between said preheating device and said furnace, the separation or classification device having a coarse material outlet and a fine material outlet, wherein the coarse material outlet is connected to the furnace, the system being characterised in that
   the furnace and the preheating device are connected to each other by means of a gas/solid material line which is arranged so as to be inclined relative to a vertical axis and communicates with the furnace at a furnace side end and communicates with the preheating device at a preheater side end, wherein furnace exhaust gases are introduced at the furnace side end of the gas/solid material line and flow to the preheating device, and solid material preheated in said preheating device is supplied at the preheater side end, and the separation or classification device is connected to a bypass line that branches off from the gas/solid material line so that at least a partial amount of the solid material preheated in said preheating device and supplied at said preheater side end is branched off via the bypass line by means of gravitational force and is supplied to the separation or classification device.

2. The system according to claim 1, wherein the bypass line and the separation or classification device are constructed in such a manner that the solid material is conveyed by means of gravitational force.

3. The system according to claim 1, wherein the inclination angle of the gas/solid material line relative to the vertical axis ranges from 25° to 65°.

4. The system according to claim 1, wherein the separation or classification device is formed by a driven sieving machine.

5. The system according to claim 1, wherein the separation or classification device has a roller table screen.

6. The system according to claim 1, wherein the separation or classification device has an inclined roller table screen.

7. The system according to claim 5, wherein the roller table screen is cooled.

8. The system according to claim 1, wherein the bypass line and the separation or classification device are arranged below the gas/solid material line.

9. The system according to claim 1, wherein a closure member is arranged in the bypass line.

10. The system according to claim 9, wherein the closure member is formed by a needle gate.

11. The system according to claim 1, wherein coarse material outlet is connected to the furnace via a connection line, and an air closure member is arranged in the connection line.

12. The system according to claim 11, wherein the connection line is in the form of a gravity line.

13. The system according to claim 11, wherein the air closure member is formed by a shuttle valve.

14. The system according to claim 1, wherein the preheating device has a central discharge funnel to which the inclined gas/solid material line is connected.

15. The system according to claim 14, wherein the discharge funnel and the bypass line are connected to the gas/solid material line in such a manner that the preheated solid material either falls directly into the bypass line or slides in via the gas/solid material line.

16. The system according to claim 1, wherein the bypass line is connected to the gas/solid material line in such a manner that the total preheated solid material can optionally also be branched off via the bypass line.

17. The system according to claim 1, wherein the preheating device is in the form of a shaft type preheater.

18. The system according to claim 1, wherein the furnace is in the form of a cylindrical rotary furnace.

19. A method for operating a system according to claim 1, including the steps of:

preheating the lumpy solid material in the preheating device with the furnace exhaust gases;

burning the preheated lumpy solid material in the furnace;

branching off at least a partial amount of the preheated lumpy solid material through the bypass line and thereafter separating the preheated lumpy solid material into coarse material and fine material in the separation or classification device;

supplying the coarse material to the furnace; and discharging the fine material.

20. The system according to claim 1, wherein the coarse material outlet of the separation or classification device discharges coarse material and the fine material outlet discharges fine material; and wherein the separation or classification device is part of a sulphur bypass system such that the fine material outlet discharges fine material with an increased sulphur content as compared to the coarse material.

* * * * *